Figure 1:
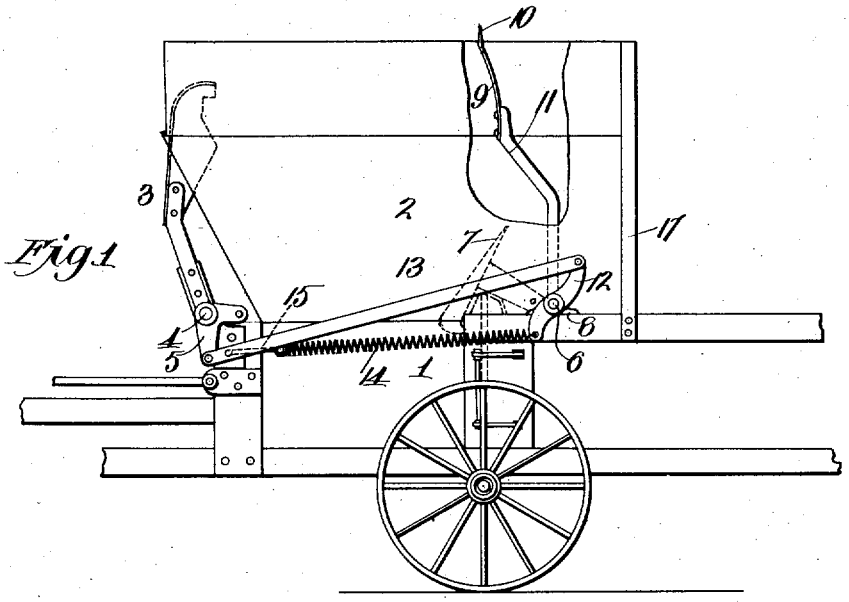

D. E. BELLINGER.

PACKER FOR BALING PRESSES.

APPLICATION FILED JAN. 16, 1909.

Reissued June 10, 1913. 13,571.

3 SHEETS—SHEET 1.

Witnesses

Frank R. Glore

H. C. Rodgers

Inventor

David E. Bellinger

By George H. Strobel Atty.

COLUMBIA PLANOGRAPH CO., WASHINGTON, D. C.

D. E. BELLINGER.

PACKER FOR BALING PRESSES.

APPLICATION FILED JAN. 16, 1909.

Reissued June 10, 1913. 13,571.

3 SHEETS—SHEET 2.

Witnesses
Frank R. Glore
A. C. Rodgers.

Inventor
David E. Bellinger
By George H. Thorpe Atty.

COLUMBIA PLANOGRAPH CO., WASHINGTON, D. C.

D. E. BELLINGER.

PACKER FOR BALING PRESSES.

APPLICATION FILED JAN. 16, 1909.

Reissued June 10, 1913.

13,571.

3 SHEETS—SHEET 3.

Witnesses
Frank R. Glore
H. C. Rodgers

Inventor
David E. Bellinger
By George H. Thorpe
Atty.

COLUMBIA PLANOGRAPH CO., WASHINGTON, D. C.

UNITED STATES PATENT OFFICE.

DAVID E. BELLINGER, OF CHANUTE, KANSAS, ASSIGNOR TO ADMIRAL HAY PRESS CO., OF KANSAS CITY, MISSOURI, A CORPORATION OF MISSOURI.

PACKER FOR BALING-PRESSES.

13,571. Specification of Reissued Letters Patent. Reissued June 10, 1913.

Original No. 872,639, dated December 3, 1907, Serial No. 365,527. Application for reissue filed January 16, 1909. Serial No. 473,031.

*To all whom it may concern:*

Be it known that I, DAVID E. BELLINGER, a citizen of the United States, residing at Chanute, in the county of Neosho, State of Kansas, have invented new and useful Improvements in Packers for Baling-Presses, of which the following is a specification.

This invention has for its object to facilitate the operation of presses for forming hay, straw or other fibrous material into bales and also reduces the manual labor usually required to be in attendance upon such machines.

The invention relates more especially to presses which are intermittently fed and have a reciprocating plunger, the charges being forced into the baling chamber at successive intervals and the press embodying a tucking mechanism.

The invention enables the compressing of a large amount of fibrous material in a small space under the feeder, thereby increasing the output of a press of given capacity, the packer or condenser being arranged with a view to enable the feeder to force the material well down into the baling chamber so as not to string back above the tucker and enable the feeder to work without binding or sticking under a big lap of material which would be the case if said material were not packed well back under the feeder.

The invention also enables the size of the hopper to be varied according to the style of crank employed, the straight crank enabling one attendant to be dispensed with as the material may be pitched directly into the hopper by one attendant. While the capacity of the press is materially increased, the draft on the power is not taxed to any noticeable extent since the strain on the packer comes into play when other parts of the press are at a standstill and before the feeder completes its stroke to compress the charge when finally condensing and forcing the same into the baling chamber.

The chief advantage of the invention resides in the peculiar arrangement of the packer with reference to the feeder and tucker whereby the material is forced well back under the feeder and retained in such position during the entire operation of the feeder, the latter being enabled to exert a pressure upon the material so as to force it squarely into the baling chamber and away from the tucker so that the material may not follow back and interfere with the free operation of the feeder.

For a full description of the invention and the merits thereof and also to acquire a knowledge of the details of construction and the means for effecting the result, reference is to be had to the following description and accompanying drawings.

Figure 2:
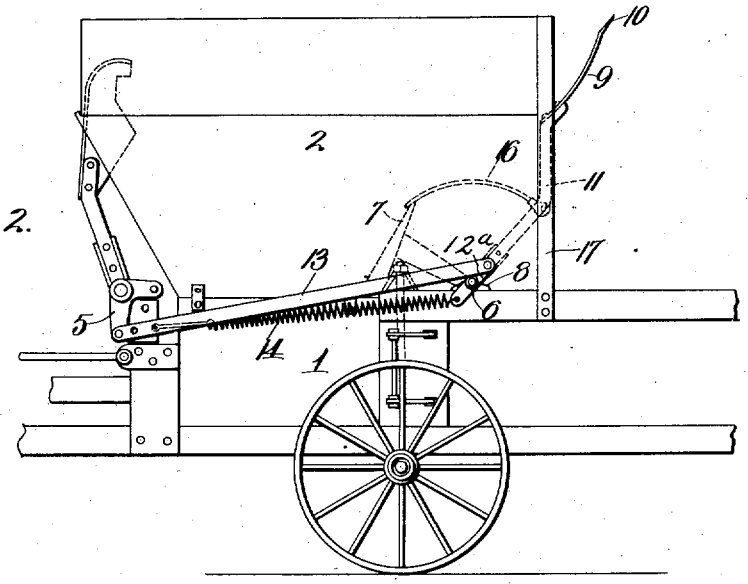
Figure 3:
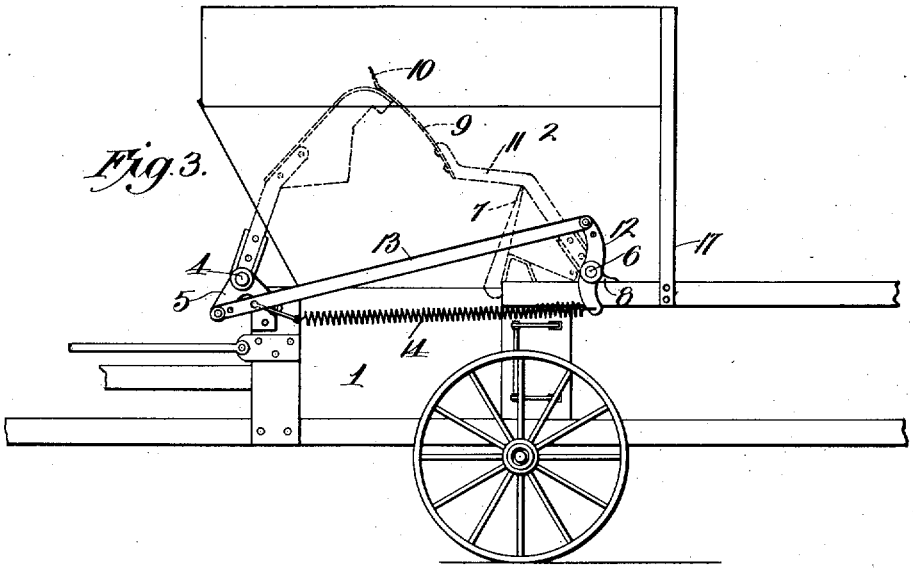
Figure 4:
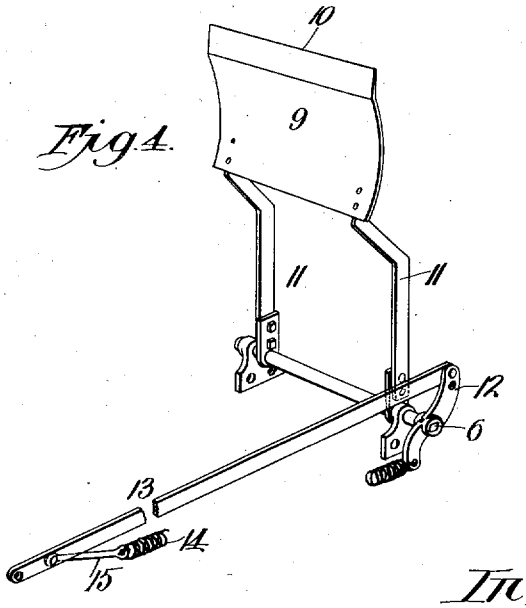
Figure 5:
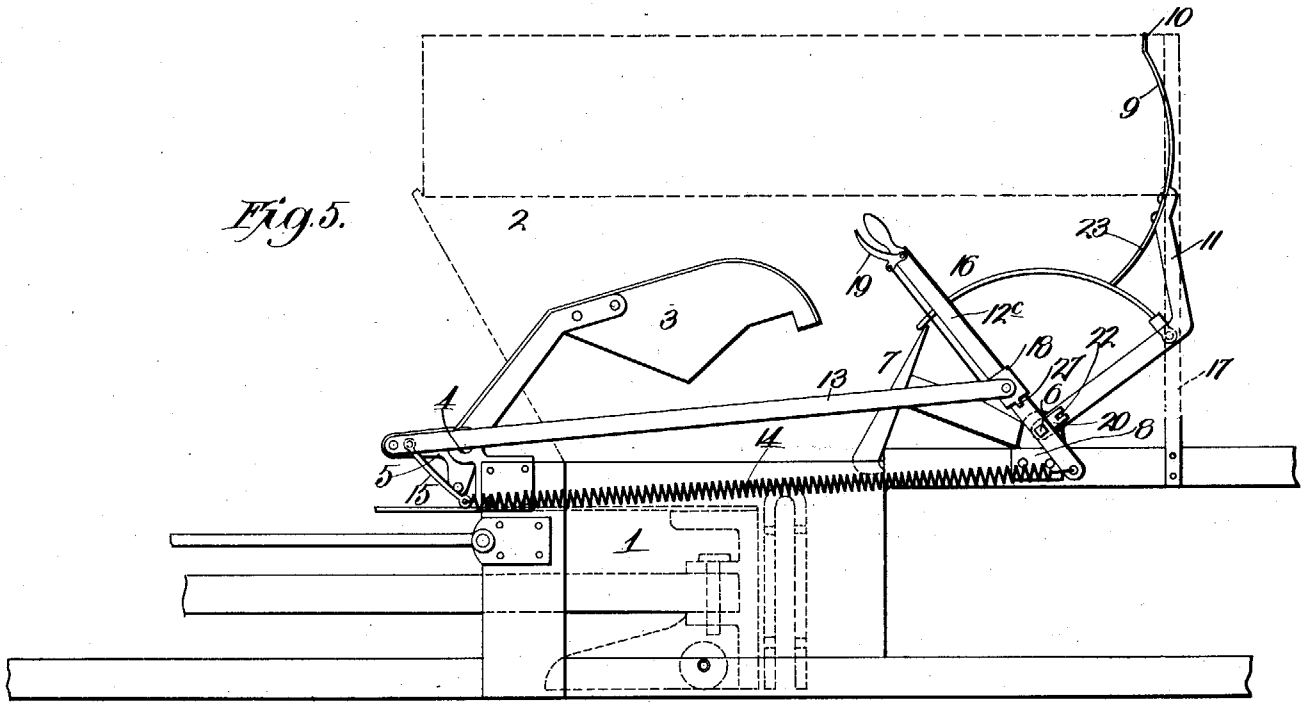

While the invention may be adapted to different forms and conditions by changes in the structure and minor details without departing from the spirit or essential features thereof, still the preferred embodiment is shown in the accompanying drawings, in which;

Figure 1, is a view in elevation of a baling press embodying the invention showing the packer standing perpendicular. Fig. 2 is a view similar to Fig. 1 showing the packer inclined and a straight crank substituted for the compound curved crank embodied in the mechanism shown in Fig. 1. Fig. 3 is a view showing the feeder and packer moved toward each other preliminary to a complete movement of the feeder in advancing the material into the baling chamber. Fig. 4 is a detail perspective view of the packer, the support and actuating means therefor. Fig. 5 is a view similar to Fig. 1 of a modification showing a construction admitting of throwing the packer out of gear when the dividing board is placed in the press.

Corresponding and like parts are referred to in the following description and indicated in all views of the drawings by the same reference characters.

The press illustrated is of ordinary construction and comprises baling chamber 1, hopper 2, feeder 3 and feeder shaft 4, the latter adapted to be driven by any suitable power employed for operating the machine. A crank 5 is mounted upon the shaft 4 and is of elbow form or bell crank type.

A shaft 6 is arranged parallel with the feeder shaft 4 and upon the opposite side of the hopper some distance in the rear of the tucker 7 and the opening in the side of the baling chamber through which the charges are fed from the hopper 2. The shaft 6 is mounted in standards 8 secured to angle bars or other convenient portion of the press. The packer 9 consists of a plate, preferably of sheet metal, which is curved between its inner and outer edges, on the arc of a circle having the feeder 3 as a radius, the outer edge portion of the packer being straight, as shown at 10, to prevent the end of the feeder from engaging therewith when the two come together.

The packer or plate 9 is attached to the outer ends of arms 11 which are bent between their ends and which are secured to the packer shaft 6 to turn therewith. A crank 12 or $12^a$ may be mounted upon an end portion of the packer shaft 6. The crank 12 is of ogee form and is somewhat longer than the crank $12^a$ which latter is straight. When the crank 12 is fitted to the packer shaft, the packer shaft 9 occupies an approximately perpendicular position as shown in Fig. 1. When the straight crank $12^a$ is fitted upon the packer shaft, the packer inclines to the perpendicular and lengthens the upper or receiving end of the hopper as indicated in Fig. 2. One end of the crank 12 or $12^a$ is connected by means of a bar or rod 13 with one arm of the crank 5 and the other arm of said crank 12 or $12^a$ is connected by means of a spring 14 with the opposite end of the bar or rod 13 near its connection with the crank 5. A rod 15 is pivotally connected to the rod or bar 13 near the connection of the latter with the crank 5 and the spring 14 is attached thereto.

In the operation of the packer, the same is moved inward to the position substantially as shown in Fig. 3, thereby forcing the material away from the tucker and into the path of the feeder. Meanwhile the feeder is advancing toward the packer, but after the feeder has reached the position illustrated in Fig. 3, the packer remains practically stationary while the feeder is making its further downward stroke to force the material into the baling chamber. During this action the end of the bar 13 attached to crank 5 moves up past the axis of shaft 4, thereby stretching the spring 14. As soon as the feeder has completed its downward stroke, the spring reacts to bring the feeder again into the position shown in Fig. 3, the packer having in the meantime retained the same position to which it was first moved; but from this point on the further action of the spring returns both the feeder and packer to their normal inoperative positions. A guard 16 closes the bottom of an end extension of the hopper 2 and is supported at its inner end by the tucker 7 and is hinged at its outer end to posts or uprights 17 rising from the frame-work of the press. This guard extends between the arms 11 of the packer and prevents any material finding its way into the space in the rear of the tucker and interfering with the operation of the packer.

In the modification shown in Fig. 5, the crank consists of a lever $12^c$ which is loosely mounted upon the shaft 6 and which is provided with a slide 18 adapted to be operated by means of a hand latch 19 near the outer end of the crank or lever $12^c$. The slide 18 is connected by the bar or rod 13 to the crank 5, thereby admitting of the movement of the feeder and crank without imparting movement to the packer when the slide 18 is disengaged from an arm 20 fast to the shaft 6. The slide 18 is adapted to make interlocking connection with the arm 20 being provided with a tooth 27 adapted to enter a notch 22 in the outer end of the arm 20, thereby locking the crank or lever $12^c$ to the arm 20 and shaft 6 when it is required to have the feeder and packer move in unison as hereinbefore described. When the slide 18 is disengaged from the arm 20, the crank or lever $12^c$ moves with the feeder, whereas the packer 9 remains stationary, thereby providing for inserting a dividing board when required. The packer 9 is extended below its connection with the arms 11 as indicated at 23 so as to touch the guard 16, or bottom of the hopper extension so as to remove hay or any other material that may lodge thereon.

Having thus described the invention what I claim as new is:

1. In a baling press embodying a feeder and a tucker, the two being spaced apart and arranged upon opposite sides of the feed opening in a side of the baling chamber, a packer pivotally supported in the rear of the tucker and adapted to condense the material and to force the same away from the tucker and beneath and into the path of the feeder, and actuating means for the feeder and packer.

2. In a baling press embodying a feeder and a tucker, the two being spaced apart and arranged upon opposite sides of the feed opening in a side of the baling chamber, a packer pivotally supported in the rear of the tucker and adapted to condense the material and to force the same away from the tucker and beneath and into the path of the feeder, a yielding connection between the packer and feeder and positive connection for transmitting motion from the feeder to the packer.

3. In a baling press embodying a feeder and a tucker arranged upon opposite sides of the feed opening leading to the baling chamber, a pivoted packer arranged to operate over the tucker and to move the material away from said tucker toward the feeder and beneath the same, a rod or bar having crank connection with the feeder and packer and a spring connecting the outer end of said rod or bar with a crank of the packer.

4. In a press embodying a feeder and a tucker arranged upon opposite sides of the feed opening of the baling chamber, a double crank removably fitted upon the packer shaft, a packer pivotally mounted and adapted to force the material away from the tucker and toward and beneath the feeder, a rod or bar connecting one arm of said double crank with a crank of the feeder shaft, and a spring connecting the opposite arm of said double crank with the outer end of said rod or bar.

5. In a press embodying a feeder and a tucker located upon opposite sides of the feed opening of the baling chamber, a packer arranged to move the material from the tucker toward and beneath the feeder, a shaft for the packer, a double crank removably fitted upon said shaft to admit of the feeder normally occupying either a vertical or an inclined position, a rod or bar connecting one arm of said crank with a crank of the feeder shaft, and a spring connecting the other arm of the crank with the outer end of said rod or bar.

6. In a baling press embodying a feeder and a tucker arranged upon opposite sides of the feed opening of the baling press, a packer adapted to force the material away from the tucker toward and beneath the feeder, and a guard for closing the space between the upper end of the tucker and the packer and forming a bottom to the extension of the hopper to prevent material finding its way into the space in the rear of the tucker.

7. In a press, the combination of a feeder, a packer and connecting means between the feeder and packer including parts adapted to be thrown into and out of engagement to admit of simultaneous movement of the feeder and packer, or independent movement of the feeder alone.

8. In a press, the combination of a feeder, a tucker, a guard extended outward from the upper end of the tucker, and a packer arranged to operate over the guard and having an extension to sweep over the guard and remove material therefrom.

9. In a baling press, a feeder and a packer pivoted at fixed points at the front and rear sides respectively, of the feed opening of the baling chamber, and means directly connected to both the packer and feeder whereby they are swung toward each other to cause the packer to condense baling material in the hopper in the path of the feeder; said means holding the packer in its condensing position until the feeder has about completed its downward or compression stroke.

10. In a baling press, a feeder and a tucker arranged at opposite sides of the feed opening for the baling chamber, a packer at the same side of the feed opening as the tucker and arranged to operate over and move material away from the tucker toward and below the feeder, and means to actuate the feeder and packer and cause the latter to condense the baling material and force the same into the path of the feeder and between the same and said feed opening; said means holding the packer in its condensing position until the feeder has about completed its downward or compression stroke.

11. In a baling press embodying a feeder and a tucker arranged upon opposite sides of the feed opening leading to the baling chamber, a pivoted packer arranged to operate over the tucker and to move the material away from said tucker toward the feeder and beneath the same, a rod or bar having crank connection with the feeder and packer, and yielding means for restoring the packer and feeder to normal position after the same have performed their packing and feeding operations.

In testimony whereof I affix my signature in the presence of two witnesses.

DAVID E. BELLINGER.

Witnesses:

JOHN R. TYE,

H. C. WILLHITE.

Copies of this patent may be obtained for five cents each, by addressing the "Commissioner of Patents, Washington, D. C."